United States Patent [19]
Tomell et al.

[11] Patent Number: 5,336,060
[45] Date of Patent: Aug. 9, 1994

[54] INTEGRALLY FORMED COUNTERWEIGHT FOR ROTOR END RING

[75] Inventors: Phillip A. Tomell, Adrian; Michael J. Maertens, Tecumseh, both of Mich.

[73] Assignee: Tecumseh Products Company, Tecumseh, Mich.

[21] Appl. No.: 922,188

[22] Filed: Jul. 30, 1992

[51] Int. Cl.⁵ .................. F04B 35/04; F04C 29/02; F16F 15/28
[52] U.S. Cl. .................. 417/410 D; 418/55.6; 418/151; 74/573 R; 184/6.18
[58] Field of Search .......... 417/410 B, 410 C, 410 D; 418/55.1, 55.6, 151; 184/6.18; 74/573 R

[56] References Cited

U.S. PATENT DOCUMENTS

| | | | |
|---|---|---|---|
| 829,251 | 8/1906 | Booraem | 74/573 |
| 4,702,681 | 10/1987 | Inaba et al. | 418/55.6 |
| 4,702,682 | 10/1987 | Inaba et al. | 418/55.6 |
| 4,915,554 | 4/1990 | Serizawa et al. | 418/94 |
| 4,934,905 | 6/1990 | Richardson, Jr. | 417/372 |
| 5,230,616 | 7/1993 | Serizawa et al. | 418/151 |

FOREIGN PATENT DOCUMENTS

| | | | |
|---|---|---|---|
| 61-118589 | 6/1986 | Japan | 418/55.1 |
| 63-32183 | 7/1986 | Japan | 418/151 |
| 63-215893 | 9/1988 | Japan | 418/151 |
| 1-3201 | 1/1989 | Japan | 418/151 |
| 1-219381 | 9/1989 | Japan | 418/151 |

*Primary Examiner*—John J. Vrablik
*Attorney, Agent, or Firm*—Baker & Daniels

[57] ABSTRACT

A hermetic compressor assembly is disclosed including a motor compressor disposed within a hermetically sealed housing, wherein the housing has an oil sump in the bottom thereof from which oil is drawn to lubricate the compressor mechanism. An electric drive motor includes a vertical rotor having a lower axial end ring with an integrally formed rotor counterweight, whereby turbulence and resulting agitation of the oil in the oil sump is prevented during rotation of the rotor.

9 Claims, 3 Drawing Sheets

INTEGRALLY FORMED COUNTERWEIGHT FOR ROTOR END RING

BACKGROUND OF THE INVENTION

The present invention relates generally to hermetic compressors of the type including a motor-compressor unit disposed within a hermetically sealed housing having an oil sump in the bottom thereof. More particularly, the invention relates to apparatus for minimizing turbulence within the housing during compressor operation, thereby reducing undesirable agitation of oil in the oil sump.

A common design for a hermetic compressor is to have the electric drive motor in the bottom portion of the housing, adjacent the oil sump, and the compressor mechanism in the top portion of the housing. In such an arrangement, the crankshaft of the compressor mechanism ordinarily is coaxially disposed within the motor rotor and operably engaged thereby. A lower end of the crankshaft extends into the oil sump so that oil can be pumped therefrom, through a passageway in the crankshaft, to the compressor mechanism. The lower axial end of the motor rotor adjacent the oil sump will typically include an axially protruding, arc-shaped weight adapted to counterbalance eccentric rotating masses associated with the compressor mechanism at the opposite end of the crankshaft.

Prior hermetic compressors included cast counterweights in the rotor end rings having axial steps. These end rings provided the necessary rotor imbalance but agitated oil within the oil sump. Other compressors included counterweights with hollows or holes to provide smooth bottoms trying to prevent oil agitation, but these also had additional parts that added to the cost of the compressor. An example of such a compressor with a separate counterweight shield is shown in U.S. Pat. No. 5,064,356.

A problem arises in the aforementioned hermetic compressors having a rotor equipped with a counterbalance weight adjacent the oil sump, in that the rotating rotor causes turbulence within the housing, which agitates the oil in the oil sump and results in lower quality oil for lubrication purposes. Specifically, turbulence may either displace the oil in the sump so as to cause an interruption of oil being supplied to the bearings, or aerate the oil to a foamy condition. In either case, failure to provide a constant supply of high quality oil may result in damage to the bearings or in inability of the compressor to function properly. The problem is exaggerated in compressors employing centrifugal rather than differential pressure pumping, because the oil flow rates are lower and interruptions in the supply of high quality oil take longer to correct themselves.

It is known in the prior art to weld a cup to the bottom of the housing, into which the oil pick-up tube on the end of the crankshaft extends. In this manner, oil must first enter a quiet zone within the cup prior to being drawn into the pick-up tube. However, this has proven only marginally successful in eliminating the adverse effects of turbulence. Another prior art device involves a horizontal separating plate that is welded to the housing intermediate the oil sump and the drive motor. The oil pick-up tube extends through a hole in the plate in order to access the oil. This method has several disadvantages, including added material and increased manufacturing costs, the need to weld to the housing, and an increased axial dimension of the housing to accommodate the plate.

While prior art attempts to ensure high quality, placid oil in the oil sump of a hermetic compressor have been somewhat successful, it is desired to provide an improved apparatus for minimizing the turbulence within the compressor housing that is attributable to the motor rotor and counterbalance weight.

SUMMARY OF THE INVENTION

The present invention overcomes the disadvantages of the above-described prior art hermetic compressors by providing an improved oil turbulence minimizing apparatus, wherein a counterbalance weight is provided integral to the rotor end ring to prevent the creation of undesirable turbulence during compressor operation.

Generally, the invention provides a hermetic compressor comprising a housing having a compressor mechanism, drive mechanism, and oil sump encased therein. The drive mechanism includes a rotor having an axial end adjacent the oil sump, to which an end ring having a smooth surface is connected. Upon rotation of the rotor, the smooth surface does not create the turbulence ordinarily caused by rotor and counterbalance weight assemblies.

More specifically, the invention provides, in one form thereof, a hermetic compressor including a motor-compressor unit contained within a housing having an oil sump, wherein an annular counterbalance weight having eccentric mass is connected to the lower axial end of a rotor. The weight has a generally smooth annular lower surface facing the oil sump.

An advantage of the oil turbulence minimizer of the present invention is that turbulence within the housing caused by the rotor and counterbalance weight assembly is substantially eliminated.

Another advantage of the oil turbulence minimizer of the present invention is that a high quality, placid oil supply is maintained in the oil sump for use in lubricating and operating the compressor.

Yet another advantage of the oil turbulence minimizer of the present invention is that the risk of damage to the compressor mechanism bearings and other parts receiving lubricating oil is greatly reduced.

A further advantage of the oil turbulence minimizer of the present invention is that a more reliable solution to reducing turbulence is provided requiring less material and manufacturing costs.

A still further advantage of the oil turbulence minimizer of the present invention, in one form thereof, is that it is combined with another functioning component of the compressor, i.e., the end ring, thereby simplifying the compressor design and gaining cost and manufacturing efficiencies.

Yet another advantage of the end ring of the present invention, in one form thereof, is that it may be easily incorporated in an existing compressor design having a rotor and counterweight assembly.

A further advantage of the oil turbulence minimizer of the present invention is that the dimensions of the compressor need not be changed to accommodate the end ring.

The invention, in one form thereof, provides a hermetic compressor assembly having a housing containing a motor drivingly coupled to a compressor mechanism for compressing refrigerant. The motor has a rotor, having an end ring, rotatable about a vertical axis. A counterbalance weight is integrally formed with said rotor end ring, having a center of gravity offset from the vertical axis of the rotor.

In one aspect of the previously described form of the invention, the rotor end ring includes an inner and outer diameter, with the inner diameter eccentrically offset from the outer diameter. The rotor inner and outer surfaces are circular while the rotor may also contain a flat axial end surface to prevent and limit oil agitation.

In another aspect of the previously described form of the invention, the rotor end ring includes an annular wall. The wall having a thickness that varies to provide the necessary balance for proper operation of the compressor.

In another form of the invention, a hermetic compressor assembly includes a housing having an oil sump and a motor-compressor unit. The motor-compressor unit is disposed within the housing, having a rotor with a connected an end ring and a compressor having a crankshaft coaxially disposed within the rotor. The crankshaft is drivingly engaged by the rotor, and extends from a lower axial end of the rotor into or near the oil sump. The crankshaft including means for drawing oil from said oil sump, for delivery through an oil passageway in the crankshaft, to the compressor for lubrication. A counterbalance weight is integrally formed within the rotor end ring having an annular body member with eccentric mass with respect to the axis of rotation of the rotor. The end ring includes a central opening through which the crankshaft extends and a generally smooth annular lower surface facing said oil sump, whereby the rotor end ring may operably rotate without causing turbulence and agitation of oil in said oil sump.

In one aspect of the previously described form of the invention, the inner rotor diameter may or may not be offset equally from the outer rotor diameter the full axial length of the end ring.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
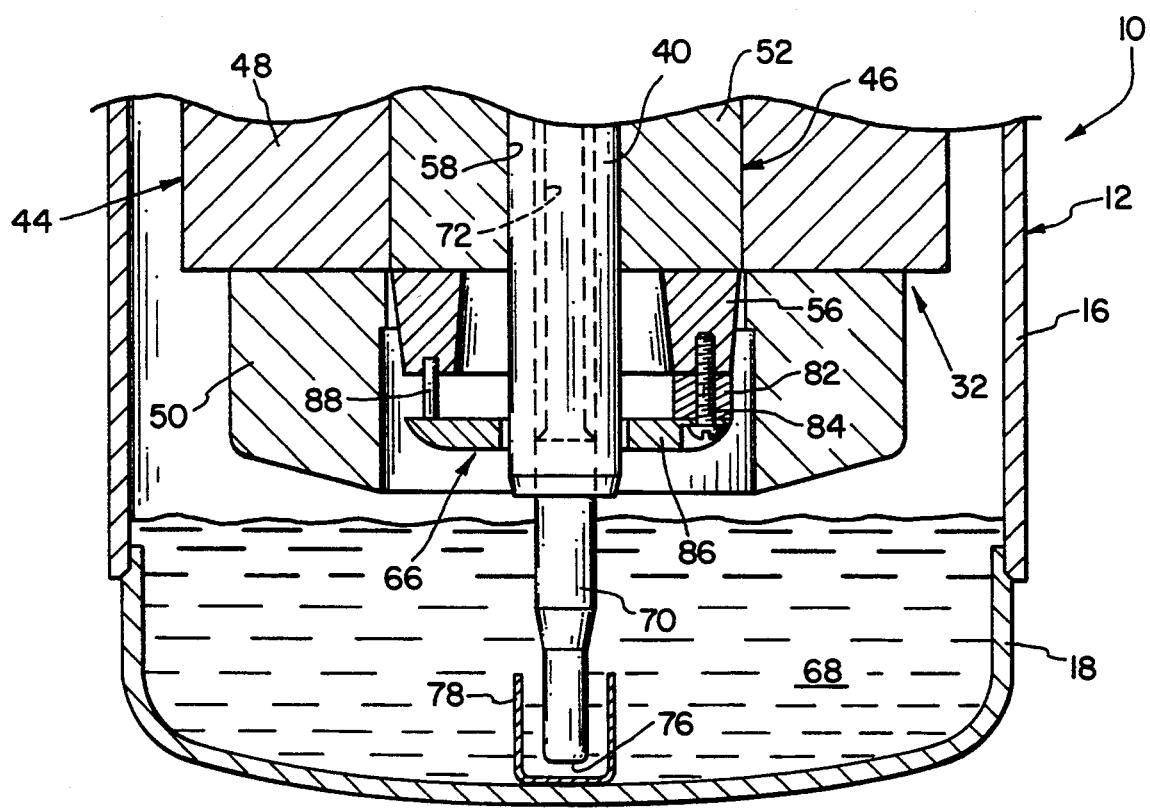
FIG. 1 is an enlarged fragmentary sectional view of the bottom portion of a prior art compressor, particularly showing the rotor.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Referring to FIG. 1, there is shown a fragment of a hermetic compressor 10 to which various embodiments of the present invention are applicable as described hereinafter. U.S. Pat. No. 4,934,905 assigned to the assignee of the present invention a general scroll compressor and is explicitly incorporated herein. FIG. 1 shows a prior art oil turbulence minimizer 66. Compressor 10 includes a housing 12 comprising a top cover plate (not shown), a central portion 16 and a bottom portion 18 wherein the housing portions are hermetically joined, as by welding. Disposed within housing 12 is a motor compressor unit comprising a scroll compressor mechanism (not shown) and an electric motor 32.

Electric motor 32 includes a stator assembly 44 and rotor assembly 46 that is rotatable about a generally vertical axis. Stator assembly 44 comprises a cylindrical core 48 and windings 50. Rotor assembly 46 comprises a laminate central portion 52 and cast upper end ring (not shown) and cast lower end ring 56.

Central portion 52 has a central aperture 58 provided therein into which is coaxially secured crankshaft 40 by an interference fit. Accordingly, crankshaft 40 is drivingly engaged by rotor assembly 46, whereby motor 32 provides a drive mechanism for the scroll compressor mechanism (not shown).

Housing 12 includes an oil sump 68 in the bottom thereon, from which oil is supplied to the compressor mechanism (not shown) by means of an oil lubrication system comprising an oil pickup tube 70 and a vertical oil passageway 72 in crankshaft 40. Oil inlet end 76 of oil pickup tube 70 extends into the top opening of an oil cup 78. Oil cup 78 is connected such as by welding to the bottom surface of housing bottom portion 18. Oil cup 78 helps to improve the quality of oil being drawn from the sump.

In order to counterbalance the rotating masses associated with the compressor mechanism, it is desirable to provide at the lower end of crankshaft 40 a counterbalance weight. Prior art counterbalance weight assembly 66 as shown in FIG. 1 comprises a solid arc portion counter weight 82 attached by means of a screw 84 threaded through and received in a counterbored plate 86. Spacer rod 88 permits attachment of plate 86 to end ring 56 in a generally flat arrangement to minimize oil turbulence during compressor operation.

Figure 2:
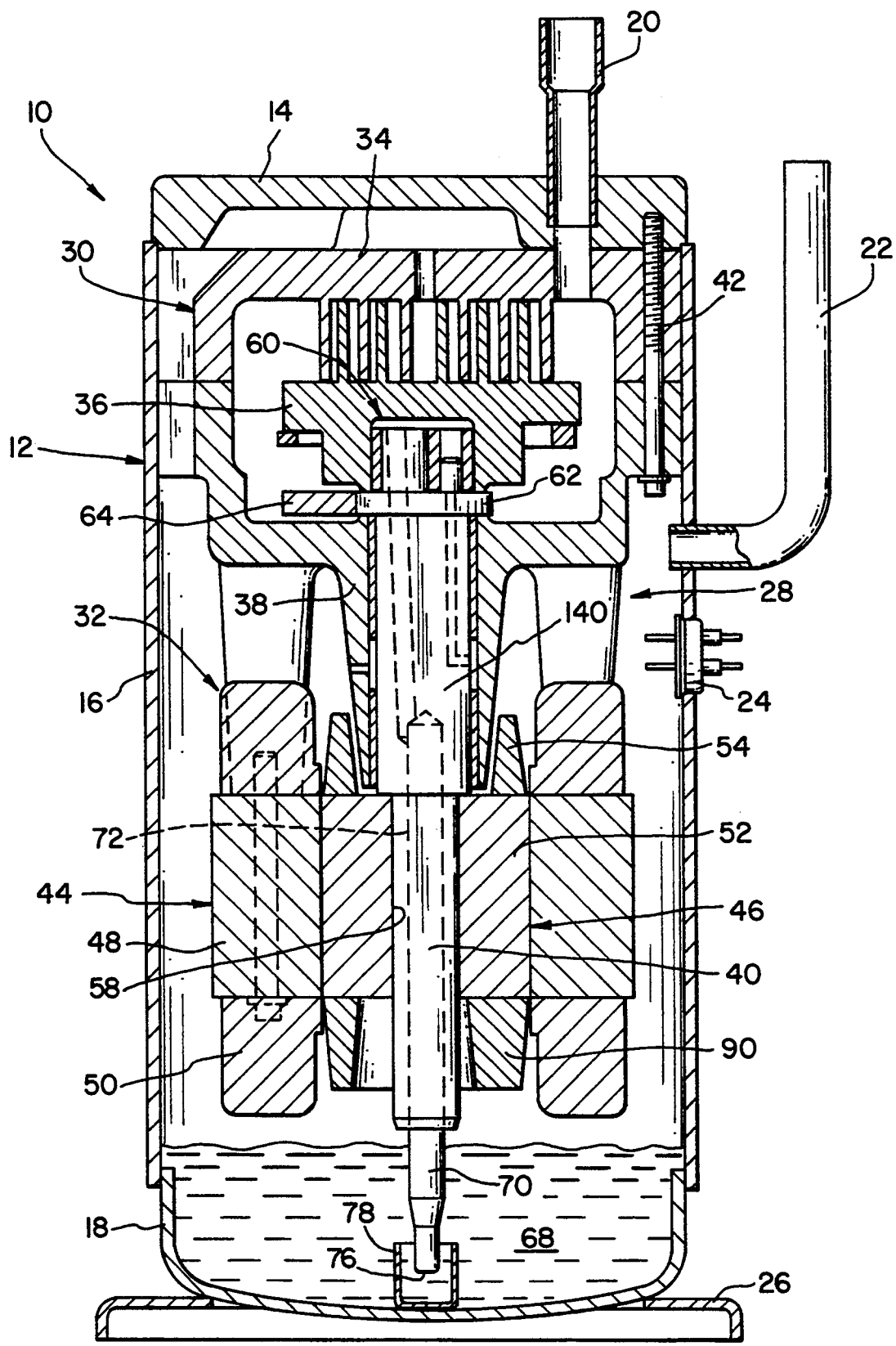
FIG. 2 is an enlarged fragmentary sectional view of the bottom portion of a compressor, particularly showing an end ring in accordance with one embodiment of the present invention.
Figure 3:
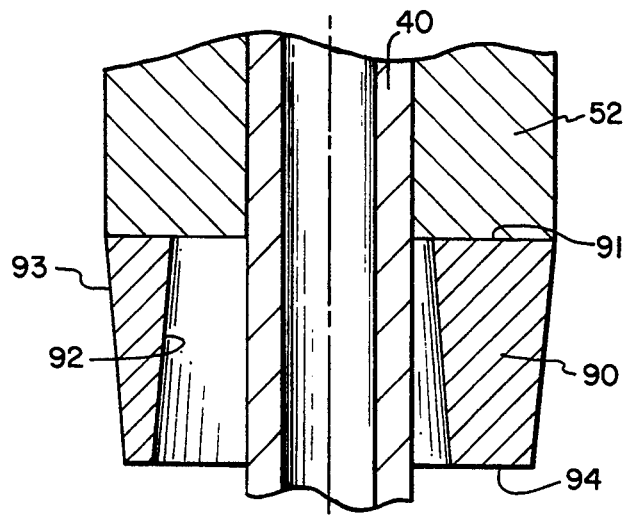
FIG. 3 is an enlarged sectional view of the rotor end ring of FIG. 2 showing the end ring in accordance with one embodiment of the present invention.

In accordance with the principles of the invention as shown in FIG. 2, compressor 10 includes an integrally formed counter weight on rotor end ring 90 which is cast on to rotor center portion 52. As shown in FIGS. 2 and 3, the cast counter weight 90 includes no additional parts and no axial steps or irregularities to stir the oil in oil sump 68.

Rotor end ring counterweight 90, of one embodiment of the present invention, is shown in FIG. 3. Rotor center portion 52, with interfit crankshaft 40, is attached to top surface 91 of counterweight 90. Counterweight inside diameter 92 and outside diameter 93 may vary to provide the shape and weight distribution to balance the forces of the compressor mechanism. Inside diameter 92 is not concentric with crankshaft 40. Bottom surface 94 is smooth to prevent causing turbulence or agitation of the oil in oil sump 68 during compressor operation.

Some crankshafts 40 may include oil pickup tubes as is known in the art and is shown in FIG. 2. In some embodiments, crankshaft 40 may not, or only partially, extend through end ring 90, with its associated oil pickup tube 70 extending the rest of the way to the oil sump. Generally, oil pickup tube 70 may be considered part of the crankshaft for purposes of describing the orientation of the crankshaft extending through end ring 90.

Figure 4:
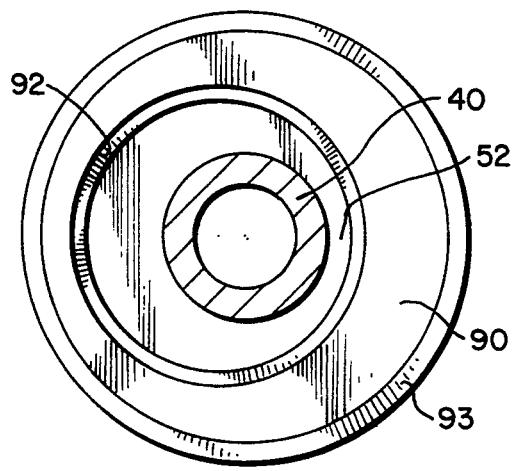
FIG. 4 is an enlarged bottom view of the end ring of FIG. 2 particularly showing the inner diameter offset from the outer diameter.

FIG. 4 shows another view of this embodiment of the invention where the center of mass of end ring 90 is offset from the rotational axis of crankshaft 40 by offsetting the inside diameter 92 of end ring 90 from outside diameter 93 for the full axial length of end ring 90. As is necessary, the offset of the two diameters may extend for the full axial length of the end ring or only part of the length depending upon the amount of counter balancing needed for proper operation and balancing of the compressor.

Figure 5:
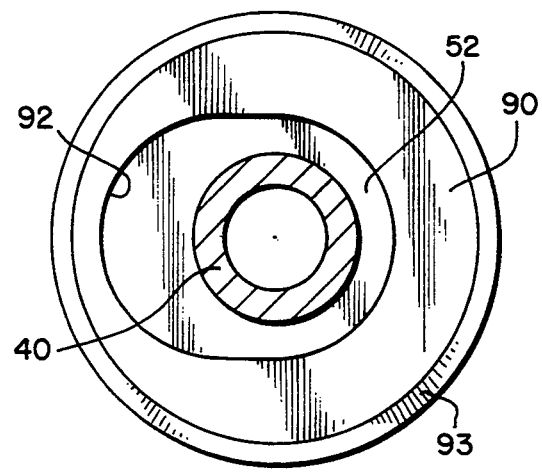
FIG. 5 is an enlarged bottom view of the end ring of FIG. 2, particularly showing an end ring of the present invention with varying wall thickness in accordance with another embodiment of the present invention.

FIG. 5 shows another embodiment of the present invention in which integrally cast counterweight end ring 90 includes an uneven chamfering of inner diameter 92 thereby changing the effectiveness of the counter weight end ring during rotation of crankshaft 40. As shown, end ring 90 is constructed by varying the wall thickness for all or part of its axial length thereby creating different counter weight forces for different compressor applications.

Alternatively, a counterweight may be constructed by directly chamfering of the outer or inner diameter of the rotor end ring until the necessary rotor balance is achieved.

It will be appreciated that each embodiment of the present invention provides a counterbalance weight end ring having a smooth bottom surface 94 facing oil sump 68 while at the same time requiring no additional parts. The provision of a smooth bottom surface is advantageous in eliminating turbulence caused by the rotating rotor assembly 46. The single piece construction of the present invention allows for a dramatic reduction in the cost of motor end ring and counter weight units.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hermetic compressor assembly, comprising;
   a housing;
   an oil sump within said housing;
   a motor-compressor unit disposed within said housing, said unit comprising electric motor having a rotor, an end ring connected to said rotor, and a compressor having a crankshaft coaxially disposed within said rotor and drivingly engaged thereby, said crankshaft extending from a lower axial end of said rotor into said oil sump and including means for drawing oil from said oil sump for delivery through an oil passageway in said crankshaft to the compressor for lubrication thereof; and
   a counterbalance weight formed within said rotor end ring comprising an monolithic annular body member having eccentric mass with respect to the axis of rotation of said rotor, said end ring including a central opening through which said crankshaft extends and a generally smooth annular lower surface facing said oil sump, whereby said rotor end ring may operably rotate without causing turbulence and agitation of oil in said oil sump.

2. The hermetic compressor assembly of claim 1 in which said rotor end ring includes a wall, said wall thickness varying to provide balance to said crankshaft.

3. The hermetic compressor assembly of claim 1 in which said rotor end ring includes an inner diameter and an outer diameter, said inner diameter eccentrically offset from said outer diameter.

4. The hermetic compressor assembly of claim 3 in which said inner and said outer surfaces are circular.

5. The hermetic compressor assembly of claim 1 in which said end ring includes an annular wall, said wall thickness varying to provide balance to said compressor.

6. The hermetic compressor assembly of claim 5 in which said rotor end ring includes an uneven wall to provide the necessary rotor imbalance.

7. A hermetic compressor assembly, comprising;
   a housing;
   an oil sump within said housing;
   a motor-compressor unit disposed within said housing, said unit comprising an electric motor having a rotor, an end ring connected to said rotor, and a compressor having a crankshaft coaxially disposed within said rotor and drivingly engaged thereby, said crankshaft extending from a lower axial end of said rotor into said oil sump and including means for drawing oil from said oil sump for delivery through an oil passageway in said crankshaft to the compressor for lubrication thereof; and
   a counterbalance weight integrally formed within said rotor end ring comprising an annular body member having eccentric mass with respect to the axis of rotation of said rotor, said end ring including a central opening through which said crankshaft extends and a generally smooth annular lower surface facing and adjacent said oil sump, said end ring further including an inner diameter and an outer diameter, said inner diameter offset from said outer diameter whereby said rotor end ring may operably rotate without causing turbulence and agitation of oil in said oil sump.

8. The hermetic compressor assembly of claim 7 in which said inner diameter is offset from said outer diameter the full axial length of said end ring.

9. A hermetic compressor assembly comprising:
   a housing;
   an oil sump within said housing;
   a compressor mechanism within said housing for compressing a refrigerant;
   a motor within said housing having a crankshaft drivingly coupled to said compressor mechanism, said motor having a rotor rotatable about an axis, said crankshaft disposed within said rotor and extending from a lower axial end of said rotor into said oil sump and including means for drawing oil from said oil sump, said rotor having a one piece eccentric end ring and counterbalance weight monolithically formed together said end ring further including an inner diameter eccentrically offset from said axis, and a generally smooth annular lower surface facing said oil sump, said crankshaft extending through said inner diameter, whereby said end ring center of gravity is offset from the axis of said rotor and said end ring may rotate without causing turbulence and agitation of oil in said oil sump.

* * * * *